United States Patent Office 3,684,530
Patented Aug. 15, 1972

---

3,684,530
PROCESS FOR COLORING FRUITS AND VEGETABLES
Henry Yokoyama, Pasadena, Calif., assignor to the United States of America as represented by the Secretary of Agriculture
No Drawing. Filed May 25, 1971, Ser. No. 146,810
Int. Cl. A23b 7/00; A23l 1/27; C07c 93/06
U.S. Cl. 99—168                    12 Claims

ABSTRACT OF THE DISCLOSURE

The color of fruits and vegetables is enhanced by applying thereto a compound of the structure

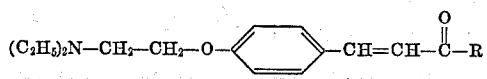

(where R is a lower alkyl, phenyl, hydroxyphenyl, etc.) which causes accumulation of lycopene in the tissues of the treated produce.

The stated compound is applied to the produce in admixture with a wax carrier or in an aqueous solution.

---

A non-exclusive, irrevocable, royalty-free license in the invention herein described, throughout the world for all purposes of the United States Government, with the power to grant sublicenses for such purposes, is hereby granted to the Government of the United States of America.

This invention relates to and has among its objects the provision of novel processes for coloring fruits and vegetables.

For further objects of the invention will be evident from the following description wherein parts and percentages are by weight unless otherwise specified. The abbreviation p.p.m. used herein refers to parts per million.

In the following description, the application of the invention to citrus fruits is stressed. It is to be understood that this particular embodiment of the invention is provided by way of illustration and not limitation. In its broad ambit, the invention is applicable to all kinds of fruits and vegetables which contain carotenogenic tissues, that is, tissues which produce carotenoid pigments. Illustrative examples of such fruits and vegetables are apricots, peaches, cherries, nectarines, tomatoes, bell peppers, chili peppers, carrots, sweet potatoes, etc., as well as oranges, lemons, tangerines, grapefruit, and other citrus fruits.

It is well known that one factor which influences the market value of fruits and vegetables is the color thereof. It often happens that when fruits and vegetables are received at the packing house, their color is deficient even though they are entirely ripe and in excellent condition. This is particularly true with citrus fruit in which case, owing to vagaries in the weather, position of the fruit on the tree, etc., the harvested fruit is often pale or non-uniform in color despite the fact that it is physiologically mature.

A principle object of the invention is to obviate the problem outlined above. The invention provides the means whereby the color of harvested fruits and vegetables can be improved, for example, oranges or tangerines which are yellow or greenish can be provided with a rich orange color.

Basically, the objects of the invention are attained by applying to the whole harvested fruit or vegetables a compound of the structure

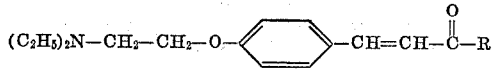

wherein R is a monovalent radical selected from the group consisting of lower alkyl (i.e., containing 1 to 4 carbon atoms), phenyl, hydroxyphenyl, methoxyphenyl, and tolyl.

Typical examples of the compounds which may be used (I) R is methyl: 2-(p-diethylaminoethoxybenzal) acetone.
(II) R is phenyl: 2-(p-diethylaminoethoxybenzal) acetophenone.
(III) R is p-hydroxyphenyl: 2-(p-diethylaminoethoxybenzal) p-hydroxyacetophenone.
(IV) R is p-methoxyphenyl: 2-(p-diethylaminoethoxybenzal) p-methoxyacetophenone.
(V) R is p-tolyl: 2-(p-diethylaminoethoxybenzal) p-methylacetophenone.

For the sake of brevity, the above compounds will be herein designated by the numbers I, II, III, IV, and V.

The compounds of the invention operate not by any dyeing effect (they are themselves essentially colorless), but by inducing the selective accumulation of lycopene as the predominant pigment in the carotenogenic tissue. Lycopene is the natural red coloring principle of the tomato, and its accumulation in the tissue causes an intensification of the color of the treated fruit or vegetable. Depending on the amount of lycopene formed, the treated produce will assume an orange or even a red color.

Since the compounds of the invention are effective in very small proportion, they are most conveniently applied in conjunction with an inert carrier such as water or wax. A typical plan for carrying out the treatment of the invention is to dip the fruit or vegetables in an aqueous solution containing a small proportion—for example, about 500 to 5000 p.p.m.—of any of the compounds described above. It is, of course, not essential to apply the aqueous solution by dipping; it can be applied by spraying, flooding, or the like.

Since many products have a natural waxy outer coating which is water-repellent, it is preferred that the solution contain a wetting agent so that the solution can uniformly coat the entire surface of the fruit or vegetable. For this purpose one may use any conventional surfactant such as soaps, sodium alkyl ($C_8$–$C_{18}$) sulphates, sodium alkane ($C_8$–$C_{18}$) sulphonates, sodium alkyl ($C_8$–$C_{20}$) benzene sulphonates, esters of sulphosuccinic acid such as sodium dioctylsulphosuccinate, etc. Wetting and dispersing agents of the non-ionic type are suitable, for example, the reaction products of ethylene or propylene oxide with fatty acids, with polyhydric alcohols, with partial esters of fatty acids and polyhydric alcohols, or with alkyl phenols, etc. Typical of such agents are a polyoxyethylene stearate containing about 20 oxyethylene groups per mole, a polyoxyethylene ether of sorbitan monolaurate containing about 16 oxyethylene groups per mole, a distearate of polyoxyethylene ether of sorbitol containing about 40 oxyethylene groups per mole, iso-octylphenyl ether of polyethylene glycol, etc. Generally, only a small proportion of surfactant is used—on the order of 0.05 to 0.5%, based on the weight of soution. In addition to, or in place of the surfactant, a supplementary solvent may be added to the primary solvent (water) in quantity sufficient to disperse the active agent. For such purpose one may use ethanol, isopropanol, or other inert volatile solvent, particularly one which is at least partly miscible with water. It is evident that the solutions need not necessarily be true solutions; they may be colloidal solutions, emulsions, or suspensions, all of these being considered as solutions for the purposes of the invention.

In the event that the compounds of the invention are applied in a wax carrier, one may use for the purpose any wax, including hydrocarbon waxes such as paraffin or microcrystalline petroleum wax; beeswax; carnauba wax; spermaceti; etc. The preparation will generally contain about 500–5000 p.p.m. of any of the compounds described above, and may be applied in various ways. One technique is to liquefy the preparation by warming it and then applying it to the fruit or vegetable by dipping or spraying. Another plan is to dissolve the wax-containing preparation in an inert volatile solvent such as hexane, octane, stoddard solvent, deodorized kerosene, or other volatile petroleum fraction and apply the resulting solution by spraying or dipping to the produce.

The action of the compounds of the invention is not immediate; the development of color requires some time for chemical reactions to take place within the tissue. Accordingly, after the step of application of the compounds, the treated produce is held so that the desired coloration will develop. Typically, the treated produce is held at ambient temperatures. Alternatively, the holding is at cold storage temperatures, for example, about 35–50° F., in which case the development will take place more slowly. In general, the temperature of holding may range from about 35 to about 90° F. Regardless of the temperature used, the treated fruit or vegetable should have access to air during the holding period so that it can respire and remain in a vital condition. The time required for color development in any particular case will vary depending on several factors including the type of fruit or vegetable, the amount of compound applied, the temperature during the holding period, the degree of color enhancement desired, etc. In many cases, excellent color development was obtained where treated citrus fruits were held for about 12–48 hours at ambient temperature.

Since the enhancement of color in accordance with the invention involves the biosynthesis of lycopene within the fruit or vegetable tissue, it is obvious that the product to which the invention is applied be in a fresh condition, i.e., in a physiologically-active state so that it is capable of respiring and undergoing normal post-harvest metabolic changes.

EXAMPLES

The invention is further demonstrated by the following illustrative examples.

EXAMPLE 1

An aqueous solution was prepared containing 5000 p.p.m. of Compound I and 0.01% of a commercial non-ionic wetting agent. Solutions were also prepared wherein Compound I was replaced by the same concentration of Compounds II, III, IV, and V, respectively.

Washington navel oranges (in whole, intact condition) were immersed for 3–5 minutes in the solutions, then removed, and held overnight at ambient temperature (about 30° C.). In each case the treated fruit was observed to have developed a uniform deep orange color. In contrast, the untreated fruit was deep yellow in color.

EXAMPLE 2

The procedure described in Example 1 was repeated with variation as to the concentration of active agent in the solutions, and time of holding (at about 29–30° C.).

Where the concentration of the active agents was 500 p.p.m., the orange coloration developed after holding for one week.

Where the concentration of the active agents was 1000 p.p.m., the orange coloration developed after holding for 3 to 4 days.

EXAMPLE 3

Compositions were prepared containing as a carrier a wax conventionally used in packing-houses for treating citrus and other fruit. This wax is commercially available as a solution in a volatile petroleum distillate. Separate preparations were made wherein Compounds I, II, III, IV, and V, in concentrations of 500 p.p.m. and 5000 p.p.m., were incorporated into the wax solution.

The wax-containing compositions were applied by spraying onto Washington navel oranges which were deep yellow in color. The fruit was then held at ambient temperature (about 29–30° C.). It was observed that the fruit coated with the preparations containing 500 p.p.m. of the active agents developed an orange color after holding for at least a week, whereas at the higher concentration (5000 p.p.m.) the orange coloration was developed in 12–24 hours.

The compounds of the invention may be synthesized by the well known Claisen-Schmidt reaction, which is illustrated as follows:

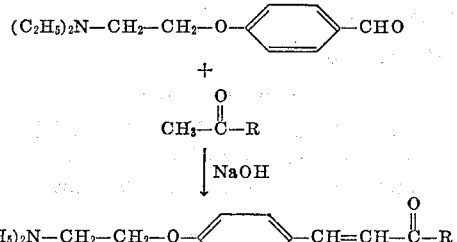

wherein R is lower alkyl, phenyl, hydroxyphenyl, methoxyphenyl, or tolyl.

The synthesis is further demonstrated by the following illustrative examples.

EXAMPLE 4

Preparation of:

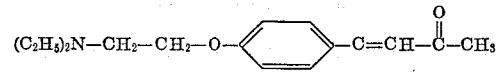

In one-liter round-bottom flask equipped with mechanical stirrer are mixed 145 g. (2.5 moles) of acetone, 221 g. (1 mole) p-dimethylaminoethoxybenzaldehyde, 400 ml. water, and 200 g. 95% ethanol. To this mixture, 50 ml. of 10% aqueous NaOH is slowly added from a dropping funnel while the solution is stirred vigorously and cooled if necessary by a water bath. The rate of addition of the alkali is so regulated that the temperature remains between 20–30° C. The mixture is now stirred for 3 hours at room temperature. At the end of this time, ether is added to the mixture and washed with several portions of water. The ether is removed by the rotary evaporator. The oily residue is then subjected to column chromatography (activated alumina, solvent system petroleum ether) and the product isolated (oily). Yield is about 75–85%.

EXAMPLE 5

Preparation of:

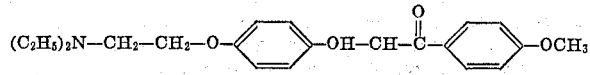

A solution of 22 g. (0.55 mole) of NaOH in 200 ml. of water and 100 g. of 95% ethanol is placed in a 500-ml. round-bottom flask provided with a mechanical stirrer. The flask is immersed in a water bath. Into the alkaline solution 65 g. (0.43 mole) p-methoxyacetophenone is poured and stirrer started; 95 g. (0.43 mole) p-dimethyl-aminoethoxybenzaldehyde is then added. The temperature of the reaction mixture should not be below 15° C. or above 30° C. The mixture is then stirred vigorously for 3 hours at room temperature. The reaction mixture is then left in the cold (4° C.) for 24 hours. The product crystallizes out; yield is about 80 to 85%.

Having thus described the invention, what is claimed is:

1. A method for enhancing the coloration of harvested fruits and vegetables which contain carotenogenic tissue, which comprises applying to the surface of the fruit or vegetable a compound of the structure

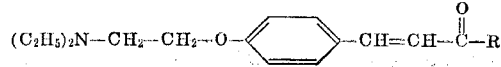

wherein R is selected from the group consisting of lower alkyl, phenyl, hydroxyphenyl, methoxyphenyl, and tolyl.

2. The process of claim 1 wherein the fruit or vegetable after application of the aforesaid compound is held at a temperature about from 35 to about 90° F. for a period long enough to develop an enhanced coloration.

3. The process of claim 1 wherein the stated compound is applied in admixture with a carrier.

4. The process of claim 1 wherein the stated compound is applied as an aqueous solution containing about from 500 to 5000 p.p.m. of the compound.

5. The process of claim 1 wherein the stated compound is applied in admixture with a wax carrier and at a concentration of about from 500 to 5000 p.p.m.

6. The process of claim 1 wherein the stated compound is applied to citrus fruit.

7. The process of claim 1 wherein the stated compound is applied to oranges.

8. The process of claim 1 wherein the stated compound is

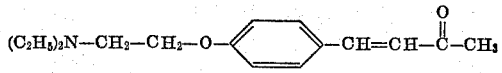

9. The process of claim 1 wherein the staed compound is

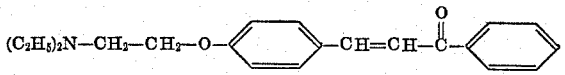

10. The process of claim 1 wherein the stated compound is

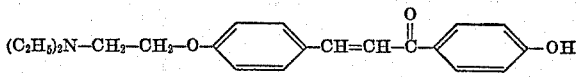

11. The process of claim 1 where the stated compound is

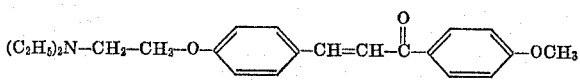

12. The process of claim 1 wherein the stated compound is

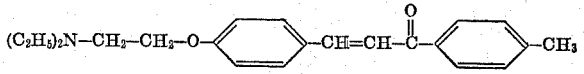

References Cited

UNITED STATES PATENTS

| | | | |
|---|---|---|---|
| 2,182,965 | 12/1939 | Ioannu | 99—103 |
| 2,212,621 | 8/1940 | Sharma | 99—168 |
| 2,425,073 | 8/1947 | Sharma | 99—168 |
| 2,739,897 | 3/1956 | Toulmin | 99—168 |

OTHER REFERENCES

The Orange, Sinclair, 1961, pp. 306–310, 314, 315, 317–327.

Braverman, Citrus Products, 1949, pp. 103–104.

MORRIS O. WOLK, Primary Examiner

S. B. DAVIS, Assistant Examiner

U.S. Cl. X.R.

99—103, 148 C; 106—272; 260—570.7